(12) United States Patent
Peuramäki

(10) Patent No.: US 7,846,553 B2
(45) Date of Patent: Dec. 7, 2010

(54) GYPSUM BOARD COATING, GYPSUM BOARD AND CARDBOARD-COATED GYPSUM BOARD PRODUCTION METHOD

(75) Inventor: Juhani Peuramäki, Valkeakoski (FI)

(73) Assignee: Walki Group Oy, Valkeakoski (FI)

( * ) Notice: Subject to any disclaimer, the term of this patent is extended or adjusted under 35 U.S.C. 154(b) by 644 days.

(21) Appl. No.: 11/574,119

(22) PCT Filed: Aug. 24, 2005

(86) PCT No.: PCT/FI2005/000365

§ 371 (c)(1),
(2), (4) Date: Sep. 19, 2007

(87) PCT Pub. No.: WO2006/021614

PCT Pub. Date: Mar. 2, 2006

(65) Prior Publication Data

US 2008/0057346 A1 Mar. 6, 2008

(30) Foreign Application Priority Data

Aug. 25, 2004 (FI) .................................. 20045307

(51) Int. Cl.
*B32B 29/00* (2006.01)
*B32B 37/00* (2006.01)
(52) U.S. Cl. .................. 428/537.5; 428/537.7; 428/703; 428/907; 156/41; 156/44
(58) Field of Classification Search ............... 428/537.7, 428/703, 907
See application file for complete search history.

(56) References Cited

U.S. PATENT DOCUMENTS

| | | | |
|---|---|---|---|
| 3,998,944 A | 12/1976 | Long | |
| 5,719,172 A | 2/1998 | Oppong et al. | |
| 6,294,186 B1 | 9/2001 | Beerse et al. | |
| 6,680,127 B2 * | 1/2004 | Capps | 424/413 |
| 2003/0035981 A1 | 2/2003 | Capps | |
| 2006/0008513 A1 * | 1/2006 | Holbert et al. | 424/443 |

FOREIGN PATENT DOCUMENTS

| | | |
|---|---|---|
| EP | 1 251 215 A2 | 10/2002 |
| GB | 1 156 816 | 7/1969 |
| GB | 1429319 A | 3/1976 |
| JP | 2004-115978 A | 4/2004 |
| WO | 2004/002916 A1 | 1/2004 |
| WO | 2004/038120 A1 | 5/2004 |
| WO | 2004/108625 A1 | 12/2004 |

OTHER PUBLICATIONS

Extended European Search Report, European Application No. 05779478.6, dated May 10, 2010, 6 pages.

* cited by examiner

*Primary Examiner*—Timothy M Speer
(74) *Attorney, Agent, or Firm*—Fitch, Even, Tabin & Flannery

(57) ABSTRACT

This invention relates to a gypsum board coating comprising cardboard with a water-repellent treatment, containing a treatment agent which prevents the growth of micro-organisms. This invention also relates to a gypsum board comprising such a coating and a method for producing the cardboard-coated gypsum board.

12 Claims, 1 Drawing Sheet

Figure 1:
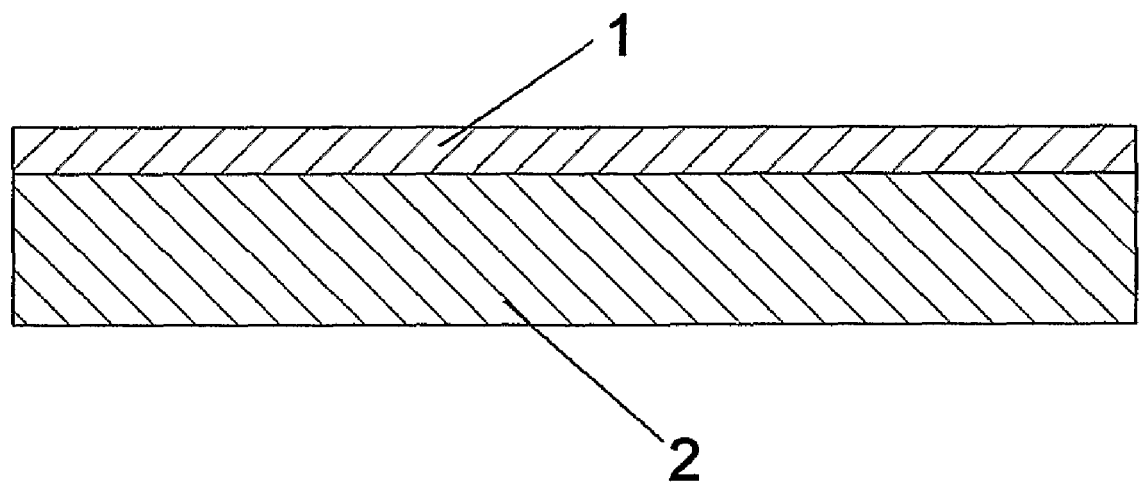

GYPSUM BOARD COATING, GYPSUM BOARD AND CARDBOARD-COATED GYPSUM BOARD PRODUCTION METHOD

This invention relates to a gypsum board coating comprising cardboard with a water-repellent treatment, and to gypsum board comprising a board made of gypsum and a cardboard coating with water-repellent treatment attached to the gypsum board. This invention also relates to a method for producing the cardboard-coated gypsum board.

Gypsum board is a construction material which is commonly used in indoor and outdoor walls. Gypsum board is susceptible to damp, which in the long term can lead to micro-organism growth. This places restrictions on the use of gypsum board in wet rooms such as beneath tiles in bathrooms. Even though boards placed beneath tiles are generally treated with a waterproofing agent, untreated areas may be left on the boards' surface, which will let moisture into the boards.

The gypsum board coating produced in accordance with this invention is characterized by a treatment agent in the cardboard which prevents the growth of micro-organisms. The boards produced in accordance with this invention are characterized by a treatment agent in the cardboard coating which prevents the growth of micro-organisms.

Micro-organisms are yeasts, bacteria and fungi such as mould fungi. By gypsum board in this application we mean a board containing gypsum. The board may contain other materials in addition to gypsum, including for instance mineral or wood fibers.

The gypsum board produced in accordance with this invention can be used as a construction material in wet rooms. In addition to the gypsum board, this board comprises a coating, optimally a cardboard coating, onto which a waterproofing treatment may be spread. The cardboard coating is made water-repellent with a polymer compound containing waxy polymers. In addition to having water-repellent properties, the polymer compound used must be sufficiently heat-resistant and allow steam to permeate through the treated cardboard. This is important because cardboard-coated gypsum boards can be dried during production to prevent their internal steam pressure from rising too high. The structures into which the gypsum boards are placed require the gypsum board to be breathable. Breathability can be evaluated for instance through steam permeability. A good steam permeability level is approximately $3 \times 10^{-9}$ kg/m²·s·Pa or an SD value of approximately 0.1 m. The cardboard's surface must be such that the waterproofing treatment attaches to it properly. Usually the cardboard coating is in a single layer, but multilayer solutions are also possible. After the production process, the cardboard is suitably acidic or can be made suitably acidic, because the functioning of benzoic acid salts is optimal in acidic conditions.

After the necessary lowering of the pH (e.g. with weak sulphuric acid), the cardboard is first treated with an agent which prevents the growth of microbes. Optimally the antimicrobial agent should be a benzoic acid salt, for example sodium benzoate or potassium benzoate. Generally the cardboard used is 150-250 g/m² in weight, the optimal weight being 200 g/m². The benzoic acid salt is dissolved in water to form a 20% solution by weight. A binding agent, for example acrylate, can be added to the solution. The binding agent has an effect e.g. on the surface hardness of the cardboard. Optimally, the binding agent should be lipophobic. The cardboard is treated with the benzoic acid salt solution applied with a surface adhesive press in such a way that the dry cardboard contains 2-4 g/m², optimally 3 g/m², of benzoic acid salt. A particular benefit in the use of benzoic acid salt lies in the fact that this treatment agent is entirely non-toxic. The skin depth of the benzoic acid should optimally be 40-60 µm and is usually approximately 50 µm. The concentration of benzoic acid salt in the part of the cardboard which it permeates is 7-9% by weight, usually approximately 8% by weight. Benzoic acid or a benzoic acid/benzoic acid salt compound can be used instead of benzoic acid salt. Adipic acid and/or citric acid can also be used separately or in combination instead of the abovementioned benzoic acid salts or in combination with the abovementioned benzoic acid salts.

Once the cardboard has been treated with the antimicrobial agent, dried and cooled, it is treated with a polymer compound comprising waxy polymers. The UV resistance of the polymer compound is usually high. The polymer compound is spread, sufficiently cooled, onto the cardboard, and any excess is scraped off with a blade scraper. After this the cardboard's heat level is raised to cause the polymer compound to be absorbed deeper into the cardboard. The polymer compound must not, however, go through to the other side of the cardboard so that the cardboard can be attached to the gypsum board at a later production stage. Therefore the cardboard should only be treated on one side and in such a way that it is still permeable to steam. A good way to check that steam permeability has been maintained is the Gurley air permeability test, which should give a result of less than 100 s/100 ml. The concentration of the polymer compound in the finished cardboard, when dry, should be 10-14 g/m², optimally 12 g/m². It is important that the thermal load of the treated cardboard does not rise above 4 MJ/m². The skin depth of the polymer compound should be 90-110 µm, optimally approximately 100 µm.

The cardboard is attached to the gypsum board with gypsite, after which the finished boards are dried. This process further improves the cardboard's steam permeability and friction. A particular benefit brought by the gypsum board coating described in this application is the fact that the coating (cardboard) can be used in the manner of ordinary gypsum cardboard without specific running parameters. A further benefit is the fact that only the coating has to be treated with an agent to prevent the growth of micro-organisms.

The cardboard could be replaced by a different wood-fiber-based material in sheet form, for example thin plywood.

FIG. 1 shows a cross-section of the gypsum board produced in accordance with this invention. The gypsum board consists of a board containing gypsum (2) and a gypsum board coating (1). The board containing gypsum (2) and the gypsum board coating (1) are connected together with gypsite. The treatments applied to the coating (1)—comprising a treatment to prevent the growth of micro-organisms and a treatment with a polymer compound—are mainly applied to the side of the coating (1), which is facing away from the gypsum board.

The invention claimed is:

1. A coating for board containing gypsum, which comprises cardboard treated to be water-repellent, wherein the cardboard contains 2-4 g/m² of a treatment agent which prevents the growth of micro-organisms, wherein said treatment agent is benzoic acid salt.

2. A coating in accordance with claim 1, wherein said treatment agent is selected from the group consisting of sodium benzoate and potassium benzoate.

3. A gypsum board, which comprises a board containing gypsum, and a cardboard coating treated to be water-repellent and attached to the board containing gypsum, wherein the cardboard coating contains 2-4 g/m² of a treatment agent which prevents the growth of micro-organisms, wherein said treatment agent is benzoic acid salt.

4. A gypsum board in accordance with claim 3, wherein said treatment agent is selected from the group consisting of sodium benzoate and potassium benzoate.

5. A gypsum board laminate comprising:
  a gypsum board which includes gypsum and the board having two surfaces;
  a cardboard surface board having a first and second surface, the first surface of the cardboard coated with from 2 to 4 g/m$^2$ of benzoic acid salt which provides a benzoic acid salt coating surface, the benzoic acid coating surface having an overcoating of a waxy polymer which extends into the cardboard surface; and
  a connecting layer between one of the surfaces of the gypsum board and the second surface of the cardboard surface board, the connecting layer binding the cardboard to the gypsum board.

6. The gypsum board laminate as recited in claim 5 wherein the benzoic acid salt is selected from the group consisting of sodium benzoate and potassium benzoate.

7. The gypsum board laminate as recited in claim 6 wherein the cardboard surface board coated with the benzoic acid salt and the overcoating has a steam permeability which is less than 100s/100 ml.

8. The gypsum board laminate as recited in claim 6 wherein the overcoating of the waxy polymer has a thickness of from 90 to 110 μm.

9. A method for the production of cardboard-coated gypsum board, wherein:
  the cardboard, which has a first side and a second side, is treated firstly on its first side with an antimicrobial agent, after which
  the cardboard is treated on its first side with a polymer compound containing waxy polymers, and
  the cardboard's second side is attached as a coating to a board containing gypsum.

10. A method in accordance with claim 9, wherein the second side of the cardboard and the board containing gypsum are connected together using gypsite.

11. The method as recited in claim 9 wherein the waxy polymers overcoat the antimicrobial agent and the overcoating has a steam permeability which is less than 100s/100ml.

12. The method as recited in claim 9 wherein the waxy polymers overcoat the antimicrobial agent and the overcoating of the waxy polymer has a thickness of from 90 to 110μm.

* * * * *